(12) United States Patent
Asakawa et al.

(10) Patent No.: US 10,181,808 B2
(45) Date of Patent: Jan. 15, 2019

(54) VEHICLE

(71) Applicant: TOYOTA JIDOSHA KABUSHIKI KAISHA, Toyota-shi, Aichi-ken (JP)

(72) Inventors: Kojiro Asakawa, Toyota (JP); Kazuhito Hayashi, Toyota (JP); Daigo Nobe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 147 days.

(21) Appl. No.: 15/248,162

(22) Filed: Aug. 26, 2016

(65) Prior Publication Data

US 2017/0066332 A1 Mar. 9, 2017

(30) Foreign Application Priority Data

Sep. 4, 2015 (JP) ................................. 2015-174908

(51) Int. Cl.
*B60L 15/02* (2006.01)
*H02P 6/04* (2016.01)
*B60L 11/12* (2006.01)

(52) U.S. Cl.
CPC .............. *H02P 6/04* (2013.01); *B60L 11/123* (2013.01); *B60L 15/02* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *Y02T 10/6217* (2013.01); *Y02T 10/644* (2013.01); *Y02T 10/645* (2013.01); *Y02T 10/7077* (2013.01)

(58) Field of Classification Search
CPC ................................... B60L 15/02; H02P 6/04
See application file for complete search history.

(56) References Cited

U.S. PATENT DOCUMENTS 6,924,629 B1 * 8/2005 Mueller .................. H02J 7/245
322/28
9,077,269 B2 * 7/2015 Nakamura ................ H02P 6/10
(Continued)

FOREIGN PATENT DOCUMENTS

WO WO 2010/137128 A1 12/2010

*Primary Examiner* — Thienvu Tran
*Assistant Examiner* — Pinping Sun
(74) *Attorney, Agent, or Firm* — Finnegan, Henderson, Farabow, Garrett & Dunner LLP (57) ABSTRACT

When an electrical primary frequency of power fluctuation of a motor is smaller than a determination threshold value fth1 that is a lower limit frequency of a frequency band where resonance occurs in a circuit including a reactor and a capacitor of a boosting converter or greater than a determination threshold value that is an upper limit frequency of the frequency band where resonance occurs, a value G2 is set as a gain G and when the electrical primary frequency is equal to or greater than the determination threshold value fth1 and equal to or smaller than the determination threshold value, a value G3 at which the upper limit frequency of the resonant frequency band has a low frequency than the determination threshold value fth1 is set as the gain G, and a current control in the boosting converter is executed using the gain G set in this way. The resonance of the circuit including the reactor and the capacitor of the boosting converter can be prevented.

6 Claims, 6 Drawing Sheets

(56) References Cited

U.S. PATENT DOCUMENTS

| | | | |
|---|---|---|---|
| 2004/0095111 A1* | 5/2004 | Kernahan | H02M 3/157 |
| | | | 323/282 |
| 2005/0212501 A1* | 9/2005 | Acatrinei | G05F 1/70 |
| | | | 323/283 |
| 2012/0068646 A1 | 3/2012 | Takamatsu et al. | |
| 2014/0376281 A1* | 12/2014 | Ohashi | H02M 3/158 |
| | | | 363/25 |
| 2015/0108929 A1* | 4/2015 | Nobe | H02P 6/085 |
| | | | 318/400.3 |
| 2015/0326124 A1* | 11/2015 | Ono | H02M 3/158 |
| | | | 323/271 |

* cited by examiner

VEHICLE

INCORPORATION BY REFERENCE

The disclosure of Japanese Patent Application No. 2015-174908 filed on Sep. 4, 2015 including the specification, drawings and abstract is incorporated herein by reference in its entirety.

BACKGROUND OF THE INVENTION

1. Field of the Invention

The invention relates to a vehicle, and more specifically to a vehicle including a motor, an inverter, a battery, and a boosting converter.

2. Description of Related Art

As this type of vehicle, a vehicle including a motor, an inverter, a battery, and a boosting converter has been suggested (for example, refer to International Publication No. 2010/137128). The inverter drives the motor. The boosting converter has a reactor and a capacitor, and is connected to a first power line to which the inverter is connected and a second power line to which the battery is connected. In this vehicle, by setting a target current of the reactor such that the voltage of the first power line becomes the target voltage and controlling the boosting converter such that a reactor current flowing to the reactor becomes the target current, a fluctuation of the voltage of the first power line is prevented, and the motor is controlled with excellent response.

In the above-described vehicle, if a frequency of power fluctuation of the motor becomes a frequency within the resonant frequency band where resonance occurs in a circuit including the reactor and the capacitor of the boosting converter, resonance occurs in the circuit, and the fluctuation of the reactor current becomes great. If the fluctuation of the reactor current become great, the fluctuation of the voltage of the first power line to which the inverter is connected becomes great, and the fluctuation of the power of the motor becomes great.

SUMMARY OF THE INVENTION

The invention provides a vehicle that prevents resonance from occurring in a circuit including a reactor and a capacitor of a boosting converter.

A vehicle according to a first aspect of the invention includes a motor; an inverter for driving the motor; a battery; a boosting converter including a reactor and a capacitor and being connected to a first power line to which the inverter is connected and a second power line to which the battery is connected; and a controller that sets a target current of the reactor such that a voltage of the first power line becomes a target voltage and executes a current control in which the boosting converter is controlled using a gain such that a reactor current flowing to the reactor becomes the target current. The controller in the first aspect sets the gain such that a frequency of power fluctuation of the motor based on a rotational speed of the motor becomes a frequency outside of a resonant frequency band where resonance occurs in a circuit including the reactor and the capacitor of the boosting converter when the current control is executed.

The controller of the vehicle according to the first aspect of the invention sets the target current of the reactor such that the voltage of the first power line becomes the target voltage, and controls the boosting converter using the gain such that the reactor current flowing to the reactor becomes the target current. Also, the controller sets the gain such that the frequency of power fluctuation of the motor based on the rotational speed of the motor becomes a frequency outside of the resonant frequency band where resonance occurs in the circuit including the boosting converter when the current control is executed. Accordingly, the frequency of power fluctuation of the motor can be prevented from becoming a frequency within the resonant frequency band, and resonance can be prevented from occurring in the circuit including the reactor and the capacitor of the boosting converter.

In the vehicle of the first aspect of the invention as such, the controller may control the inverter in a plurality of control modes including a rectangular wave control mode such that a torque is output from the motor, and may set the gain such that the frequency of power fluctuation of the motor falls out of the resonant frequency band when the control mode is the rectangular wave control mode. When the control mode of the inverter is the rectangular wave control mode, as compared to when the control mode is other control modes, it can be assumed that variation in the reactor current becomes greater when resonance has occurred in the circuit including the reactor and the capacitor of the boosting converter. Therefore, when the control mode of the inverter is the rectangular wave control mode, the occurrence of resonance in the circuit including the reactor and the capacitor of the boosting converter can be prevented at a more suitable timing by setting the gain such that the frequency of power fluctuation of the motor falls out of the resonant frequency band.

In the vehicle of the first aspect of the invention, the resonant frequency band may be set using a carrier frequency for controlling the boosting converter. The resonant frequency band moves to a high-frequency side or a low-frequency side according to the carrier frequency. Therefore, the frequency of power fluctuation of the motor can be more accurately a frequency outside of the resonant frequency band by setting the resonant frequency band using the carrier frequency. Accordingly, resonance can be more suitably prevented from occurring in the circuit including the reactor and the capacitor of the boosting converter.

Additionally, in the vehicle according of the first aspect of the invention, the controller may set the gain to a first value such that the frequency becomes a frequency outside of the resonant frequency band when the frequency of power fluctuation of the motor is within the resonant frequency band, and may set the gain to a second value different from the first value such that the frequency is kept out of the resonant frequency band when the frequency of power fluctuation of the motor is out of the resonant frequency band.

A vehicle according to a second aspect of the invention includes a motor; an inverter for driving the motor; a battery; a boosting converter including a reactor and a capacitor and being connected to a first power line to which the inverter is connected and a second power line to which the battery is connected; and a controller that sets a target current of the reactor such that a voltage of the first power line becomes a target voltage and executes a current control in which the boosting converter is controlled using a gain such that a reactor current flowing to the reactor becomes the target current. The controller of the second aspect stops the current control to execute a voltage control in which the boosting converter is controlled such that a voltage of the first power line becomes a target voltage, when a frequency of power fluctuation of the motor based on the rotational speed of the motor is in the resonant frequency band where resonance occurs in a circuit including the reactor and the capacitor of the boosting converter.

The controller of the vehicle according to the second aspect of the invention executes the current control in which the target current of the reactor is set such that the voltage of the first power line becomes the target voltage, and controls the boosting converter using the gain such that the reactor current flowing to the reactor becomes the target current. Also, the controller stops the current control to execute a voltage control in which the boosting converter is controlled such that a voltage of the first power line becomes a target voltage, when a frequency of power fluctuation of the motor based on the rotational speed of the motor is in the resonant frequency band where resonance occurs in a circuit including the reactor and the capacitor of the boosting converter. If the current control is executed when the frequency of power fluctuation of the motor is in the resonant frequency band, resonance may occur in the circuit including the reactor and the capacitor of the boosting converter. Therefore, when the frequency of power fluctuation of the motor is in the resonant frequency band, the occurrence of resonance in the circuit including the reactor and the capacitor of the boosting converter can be prevented by stopping the current control.

In the vehicle according to the second aspect as such, the controller may control the inverter in a plurality of control modes including a rectangular wave control mode such that a torque is output from the motor, and may stop the current control to execute the voltage control when the control mode is the rectangular wave control mode and the frequency of power fluctuation of the motor is in the resonant frequency band. When the control mode of the inverter is the rectangular wave control mode, as compared to when the control mode is other control modes, it can be assumed that variation in the reactor current becomes greater when resonance has occurred in the circuit including the reactor and the capacitor of the boosting converter. Therefore, when the control mode is the rectangular wave control mode, and the frequency of power fluctuation of the motor is in the resonant frequency band, the occurrence of resonance in the circuit including the reactor and the capacitor of the boosting converter can be prevented at a more suitable timing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EXAMPLES

Next, modes for carrying out the invention will be described using examples.

Figure 1:
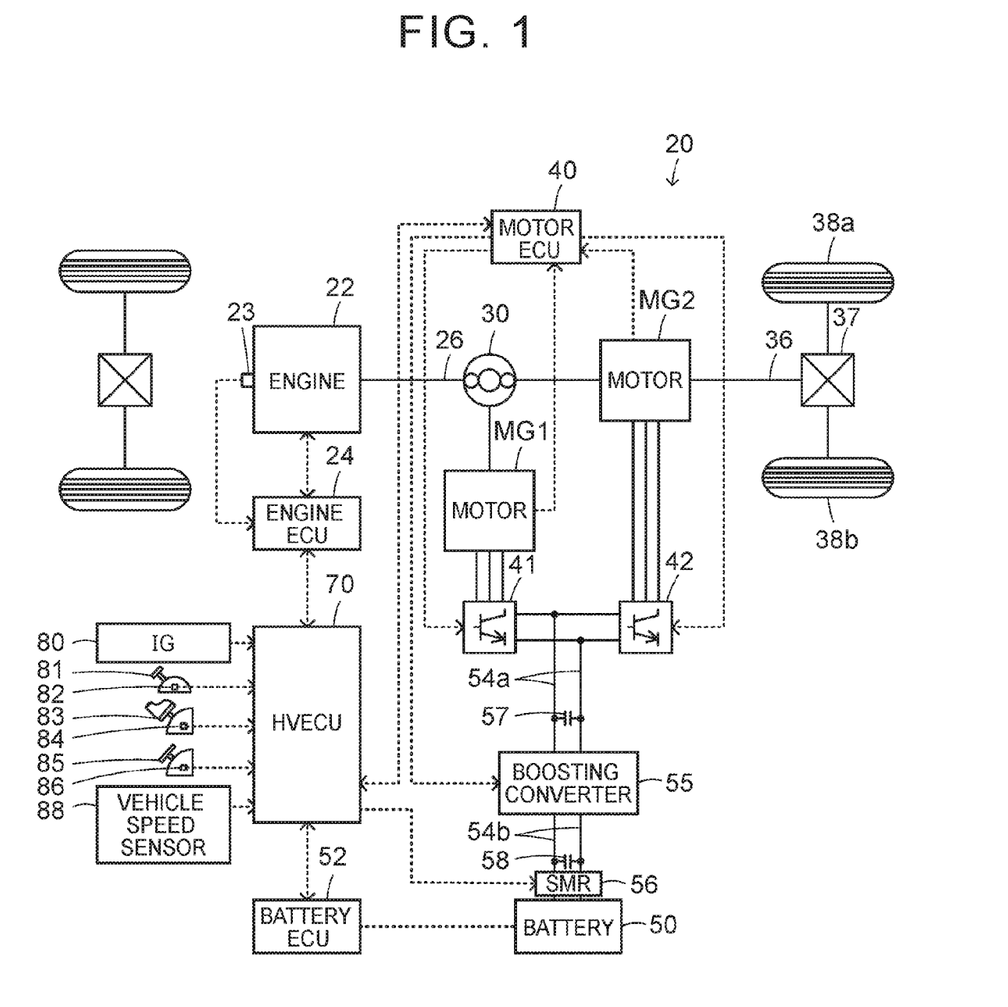
FIG. 1 is a configuration view illustrating the outline of the configuration of a hybrid vehicle 20 as a first example of the invention.
Figure 2:
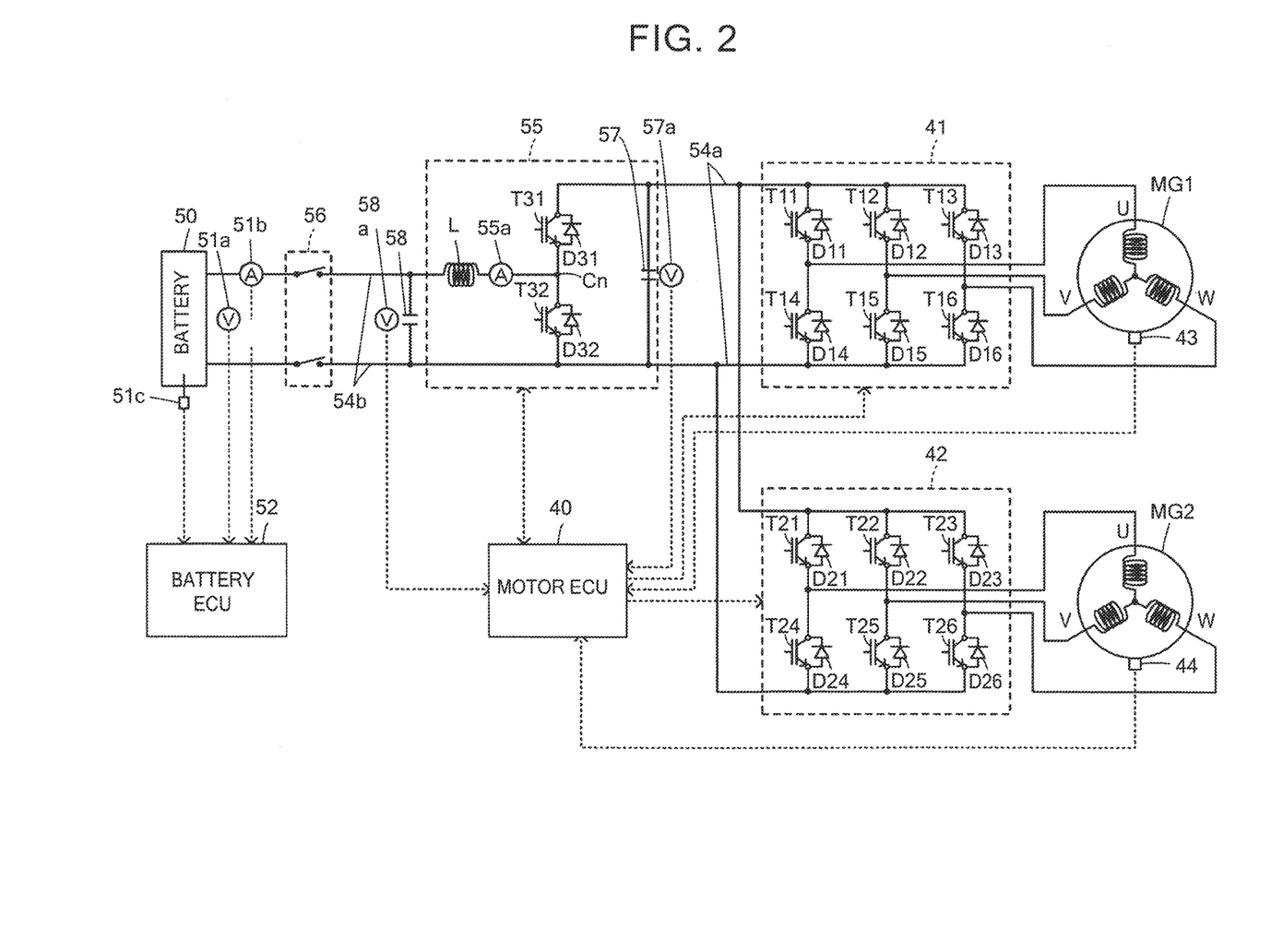
FIG. 2 is a configuration view illustrating the outline of the configuration of an electrical drive system including motors MG1, MG2.

FIG. 1 is a configuration view illustrating the outline of the configuration of a hybrid vehicle 20 as a first example of the invention. FIG. 2 is a configuration view illustrating the outline of the configuration of an electrical drive system including motors MG1, MG2. A hybrid vehicle 20 of the first example, as illustrated in FIG. 1, includes an engine 22, a planetary gear 30, motors MG1, MG2, inverters 41, 42, a boosting converter 55, a battery 50, a system main relay 56, and an a electronic control unit 70 for a hybrid vehicle (hereinafter referred to as an HVECU).

The engine 22 is constituted as an internal combustion engine that outputs power by using gasoline, gas oil, or the like as fuel. The operation of the engine 22 is controlled by an electronic control unit 24 for an engine (hereinafter referred to as an engine ECU).

Although not illustrated, the engine ECU 24 is constituted as a microprocessor centered on a CPU, and includes, in addition to the CPU, a ROM that stores a processing program, a RAM that temporarily stores data, input and output ports, and a communication port. Signals from various sensors required to control the operation of the engine 22 are input from an input port to the engine ECU 24. The signals from the various sensors may include the followings.

A crank angle θcr from a crank position sensor 23 that detects the rotational position of a crankshaft 26 of the engine 22

A throttle opening degree TH from a throttle valve position sensor that detects the position of a throttle valve Various control signals for controlling the operation of the engine 22 are output via an output port from the engine ECU 24. The various control signals may include the followings.

A driving signal to a fuel injection valve

A driving signal to a throttle motor that adjusts the position of the throttle valve A control signal to an ignition coil integrated with an ignitor The engine ECU 24 is connected to the HVECU 70 via the communication port. The engine ECU 24 controls the operation of the engine 22 by a control signal from the HVECU 70. Additionally, the engine ECU 24 outputs data about the operational state of the engine 22 to the HVECU 70 if necessary. The engine ECU 24 calculates the rotational speed of the crankshaft 26, that is, the rotational speed Nm of the engine 22, on the basis of the crank angle θcr detected by the crank position sensor 23.

The planetary gear 30 is constituted as a single pinion type planetary gear mechanism. A rotor of the motor MG1 is connected to a sun gear of the planetary gear 30. A driving shaft 36 coupled to driving wheels 38a, 38b via a differential gear 37 and a rotor of the motor MG2 are connected to a ring gear of the planetary gear 30. The crankshaft 26 of the engine 22 is connected to a carrier of the planetary gear 30.

The motor MG1 is constituted as a synchronous generator motor having a rotor in which permanent magnets are embedded, and a stator around which three-phase coils are wound. In the motor MG1, as described above, the rotor is connected to the sun gear of the planetary gear 30. The motor MG2 is constituted as a synchronous generator motor having a rotor in which permanent magnets are embedded, and a stator around which three-phase coils are wound, similar to the motor MG1. In the motor MG2, as described above, the rotor is connected to the driving shaft 36.

As illustrated in FIGS. 1 and 2, an inverter 41 is connected to a high-voltage-side power line 54a. The inverter 41 has six transistors (switching elements) T11 to T16 and six diodes D11 to D16. The transistors T11 to T16 are respectively arranged in pairs so as to become a source side and a sink side with respect to a positive electrode bus bar and a negative electrode bus bar of the high-voltage-side power line 54a. The six diodes D11 to D16 are respectively connected to the transistors T11 to T16 in parallel in a reverse direction. Each of the three-phase coils (U-phase, V-phase, and W-phase) of the motor MG1 is connected to a connection point between transistors that become each pair of the transistors T11 to T16. Therefore, by the rates of ON time of the transistors T11 to T16 that make pairs being adjusted by an electronic control unit 40 for a motor (hereinafter referred to as a motor ECU) when a voltage is being applied to the inverter 41, a rotating magnetic field is formed in the three-phase coils and thus the motor MG1 is rotationally driven.

An inverter 42 is connected to the high-voltage-side power line 54a, similar to the inverter 41. Additionally, the inverter 42 has six transistors (switching element) T21 to T26 and six diodes D21 to D26, similar to the inverter 41. By the rates of ON time of the transistors T21 to T26 that make pairs being adjusted by the motor ECU 40 when a voltage is being applied to the inverter 42, a rotating magnetic field are formed in the three-phase coils and the motor MG2 is rotationally driven.

The boosting converter 55 is connected to the high-voltage-side power line 54a, and a low-voltage-side power line 54b to which the battery 50 is connected. The boosting converter 55 has two transistors (switching elements) T31, T32, two diodes D31, D32, and a reactor L. The transistor T31 is connected to the positive electrode bus bar of the high-voltage-side power line 54a. The transistor T32 is connected to the transistor T31 and the negative electrode bus bars of the high-voltage-side power line 54a and the low-voltage-side power line 54b. The two diodes D31, D32 are respectively connected to the transistors T31, T32 in parallel in a reverse direction. The reactor L is connected to a connection point Cn between the transistors T31, T32, and the positive electrode bus bar of the low-voltage-side power line 54b. By the rates of ON time of the transistors T31, T32 being adjusted by the motor ECU 40, the boosting converter 55 steps up the power of the low-voltage-side power line 54b to supply the step-up power to the high-voltage-side power line 54a, or steps down the power of the high-voltage-side power line 54a to supply the step-down power to the low-voltage-side power line 54b.

A high-voltage side capacitor 57 is connected to the positive electrode bus bar and the negative electrode bus bar of the high-voltage-side power line 54a. A low-voltage side capacitor 58 is connected to the positive electrode bus bar and the negative electrode bus bar of the low-voltage-side power line 54b.

Although not illustrated, the motor ECU 40 is constituted as a microprocessor centered on a CPU, and includes, in addition to the CPU, a ROM that stores a processing program, a RAM that temporarily stores data, input and output ports, and a communication port. Signals from various sensors required to control the driving of the motors MG1, MG2 and the boosting converter 55 are input to the motor ECU 40 via the input port. The signals from the various sensors may include the followings.

Rotational positions em1, em2 from rotational position detecting sensors 43 and 44 that detect rotational positions of the rotors of the motors MG1, MG2

Phase currents from current sensors that detect currents that flow to respective phases of the motors MG1, MG2

A voltage VH of the high-voltage side capacitor 57 (high-voltage-side power line 54a) from a voltage sensor 57a attached between terminals of the high-voltage side capacitor 57

A voltage VL of the low-voltage side capacitor 58 (low-voltage-side power line 54b) from a voltage sensor 58a attached between terminals of the low-voltage side capacitor 58 A current IL (a positive value when flowing from a reactor L side to a connection point side) of the reactor L from a current sensor 55a attached between the connection point Cn of the boosting converter 55 and the reactor L Various control signals for controlling the driving of the motors MG1, MG2 and the boosting converter 55 are output from the motor ECU 40 via the output port. The various control signals may include the followings.

Switching control signals to the transistors T11 to T16 and T21 to T26 of the inverters 41, 42

Switching control signals to the transistors T31, T32 of the boosting converter 55

The motor ECU 40 is connected to the HVECU 70 via the communication port. The motor ECU 40 controls the driving of the motors MG1, MG2 and the boosting converter 55 by control signals from the HVECU 70. Additionally, the motor ECU 40 outputs data about the drive states of the motors MG1, MG2 and the boosting converter 55 to the HVECU 70 if necessary. In addition, the motor ECU 40 calculates the rotational speeds Nm1, Nm2 of the motors MG1, MG2, on the basis of the rotational positions θm1, θm2 of the rotors of the motors MG1, MG2.

The battery 50 is constituted as, for example, a lithium ion secondary battery or a nickel hydrogen secondary battery, and is connected to the low-voltage-side power line 54b. The battery 50 is managed by the electronic control unit 52 for a battery (hereinafter referred to as a battery ECU).

Although not illustrated, the battery ECU 52 is constituted as a microprocessor centered on a CPU, and includes, in addition to the CPU, a ROM that stores a processing program, a RAM that temporarily stores data, input and output ports, and a communication port. Signals from various sensors required to manage the battery 50 are input to the battery ECU 52 via an input port. The signals from the various sensors may include the followings.

A battery voltage Vb from a voltage sensor 51a installed between terminals of the battery 50

A battery current Ib from a current sensor 51b attached to an output terminal of the battery 50

Battery temperature Tb from a temperature sensor 51c attached to the battery 50

The battery ECU 52 is connected to the HVECU 70 via the communication port. The battery ECU 52 outputs data about the state of the battery 50 to the HVECU 70 if necessary. The battery ECU 52 calculates a power storage rate SOC of the battery 50, on the basis of an integrated value of the battery current Ib detected by the current sensor 51b. The power storage rate SOC of the battery 50 is a rate of the capacity of power that is dischargeable from the battery 50 to the total capacity of the battery 50. Additionally, the battery ECU 52 calculates input and output limits Win and Wout of the battery 50, on the basis of the calculated power storage rate SOC, and the battery temperature Tb detected by the temperature sensor 51c. The input and output limits Win and Wout of the battery 50 are maximum allowable powers that may charge and discharge the battery 50.

The system main relay 56 is provided nearer the battery 50 side than the low-voltage side capacitor 58 in the positive electrode bus bar and the negative electrode bus bar of the low-voltage-side power line 54b. The system main relay 56 connects the battery 50 and the boosting converter 55 to each other at the time of ON, and disconnects the battery 50 and the boosting converter 55 from each other at the time of OFF.

Although not illustrated, the HVECU 70 is constituted as a microprocessor centered on a CPU, and includes, in addition to the CPU, a ROM that stores a processing program, a RAM that temporarily stores data, input and output ports, and a communication port. Signals from various sensors are input to the HVECU 70 via an input port. The signals from the various sensors may include the followings.

An ignition signal from an ignition switch 80
A shift position SP from a shift position sensor 82 that detects the operative position of a shift lever 81
An accelerator opening degree Acc from an accelerator pedal position sensor 84 that detects the amount of stepping of an accelerator pedal 83
A brake pedal position BP from a brake pedal position sensor 86 that detects the amount of stepping of a brake pedal 85
A vehicle speed V from a vehicle speed sensor 88

A control signal or the like to the system main relay 56 is output from the HVECU 70 via an output port. The HVECU 70, as described above, is connected to the engine ECU 24, the motor ECU 40, the battery ECU 52 via the communication port. The HVECU 70 performs the exchange of various control signals and data with the engine ECU 24, the motor ECU 40, the battery ECU 52.

The hybrid vehicle 20 of the first example configured in this way travels in traveling modes, such as a hybrid traveling mode (HV traveling mode) and an electric traveling mode (EV traveling mode). The HV traveling mode is a traveling mode in which the vehicle travels with the operation of the engine 22 and the driving of the motors MG1, MG2. The EV traveling mode is a traveling mode in which the vehicle travels by stopping the operation of the engine 22 and driving the motor MG2.

In the HV traveling mode, first, the HVECU 70 sets a required torque Tr* required for traveling on the basis of the accelerator opening degree Acc (to be output to the driving shaft 36) from the accelerator pedal position sensor 84 and the vehicle speed V from the vehicle speed sensor 88. Subsequently, a traveling power Pdrv* required for traveling is calculated by multiplying the required torque Tr* by the rotational speed Np of the driving shaft 36. Here, the rotational speed obtained by multiplying the rotational speed Nm2 of the motor MG2 and the vehicle speed V by a conversion factor, or the like can be used as the rotational speed Np of the driving shaft 36. Then, a required power Pe* required for the vehicle is calculated by subtracting a required charge/discharge power Pb* (a positive value when the battery 50 is discharged) of the battery 50 from the traveling power Pdrv*. Next, a target rotational speed Ne* and a target torque Te* in the engine 22 and torque commands Tm1*, Tm2* of motors MG1, MG2 are set such that the required power Pe* is output from the engine 22 and the required torque Tr* is output to the driving shaft 36 within the input and output limits Win and Wout of the battery 50. Then, the target rotational speed Ne* and the target torque Te* in the engine 22 are transmitted to the engine ECU 24, and the torque commands Tm1*, Tm2* of the motors MG1, MG2 are transmitted to the motor ECU 40. The engine ECU 24 performs the intake air amount control, fuel injection control, ignition control, opening/closing timing control, such that the engine 22 is operated on the basis of the received target rotational speed Ne* and the received target torque Te*, if the target rotational speed Ne* of the engine 22 and the target torque Te* are received. If the torque commands Tm1*, Tm2* of the motors MG1, MG2 are received, the motor ECU 40 controls switching of the switching elements of the inverters 41, 42 such that the motors MG1, MG2 are driven by the torque commands Tm1*, Tm2*. In this HV traveling mode, for example, when the required power Pe* reaches a value equal to or smaller than a stop threshold value Pstop, it is determined that the stop contrition of the engine 22 is satisfied, the operation of the engine 22 is stopped, and shift to the EV traveling mode is made.

In the EV traveling mode, the HVECU 70 first sets the required torque Tr*, similar to the HV traveling mode. Subsequently, the value 0 is set to the torque command Tm1* of the motor MG1. Then, the torque command Tm2* of the motor MG2 is set such that the required torque Tr* is output to the driving shaft 36 within the input and output limits Win and Wout of the battery 50. Then, the torque commands Tm1*, Tm2* of the motors MG1, MG2 are transmitted to the motor ECU 40. If the torque commands Tm1*, Tm2* of the motors MG1, MG2 are received, the motor ECU 40 controls switching of the switching elements of the inverters 41, 42 such that the motors MG1, MG2 are driven by the torque commands Tm1*, Tm2*. In this EV traveling mode, for example, when the required power Pe* calculated similar to the HV traveling mode reaches a value equal to or greater than a start threshold value Pstart greater than the stop threshold value Pstop, it is determines that the starting condition of the engine 22 is satisfied, the engine 22 is started, and shift to the HV traveling mode is made.

In the first example, the motor ECU 40 selects one control mode from the plurality of control modes on the basis of the rotational speeds Nm 1, Nm2 of the motors MG1, MG2 and the torque commands Tm1*, Tm2*, respectively, and controls switching of the inverters 41, 42. Here, as the control modes of the inverters 41, 42, a sinusoidal control mode in which pulse width modulation (PWM) control is performed by triangular wave comparison; an overmodulation control mode in which a sinusoidal output voltage command value is generated with an amplitude exceeding the amplitude of a triangular wave, and an inverter is switched by a PWM signal serving as a converted overmodulation voltage; and a rectangular wave control mode in which an inverter is switched at a rectangular wave voltage of a voltage phase according to a torque command are respectively selected sequentially from a region where the rotational speed and torque of a motor is low, from maps that are not illustrated. This is because, in light of the characteristics that the output response and controllability of the motors MG1, MG2 become good and the output thereof becomes small, and consequently the switching loss or the like of the inverters 41, 42 becomes great in order of the rectangular wave control method, the overmodulation control method, and the sinusoidal control method, as characteristics of the motors MG1, MG2, or the inverters 41, 42, the output response and controllability of the motors MG1, MG2 are improved by controlling the inverters 41, 42 by the sinusoidal control method, in a region of a high rotational speed and a low torque, and a large output is enabled and the switching loss or the like of the inverters 41, 42 is reduced by controlling the inverters 41, 42 by the rectangular wave control method in a region of a high rotational speed and high torque region.

The motor ECU 40 sets a target voltage VH* required to drive the motors MG1, MG2 on the basis of the torque commands Tm1*, Tm2* of motors MG1, MG2 and the rotational speeds Nm1, Nm2 of the motors MG1, MG2. Then, a target current ILtag of the reactor L required for the voltage VH of the high-voltage-side power line 54a to become the target voltage VH* is set. Then, a target duty ratio Dtag* of the two transistors T31, T32 of the boosting converter 55 is set by the following Expression (1) such that the current IL flowing to the reactor L becomes the target current ILtag, and switching of the transistors T31, T32 is controlled using the set target duty ratio Dtag* and a carrier frequency fc. Expression (1) is a relational expression in feedback control for causing the current IL of the reactor L to coincide with the target current ILtag. "G" of the second item of a right side is a gain G of a proportional item in Expression (1). Such feedback control for causing the current IL of the reactor L to coincide with the target current ILtag may be referred to as "current control".

$$Dtag^* = \text{Previous } Dtag^* + G \cdot (ILtag - IL) \quad (1)$$

Figure 3:
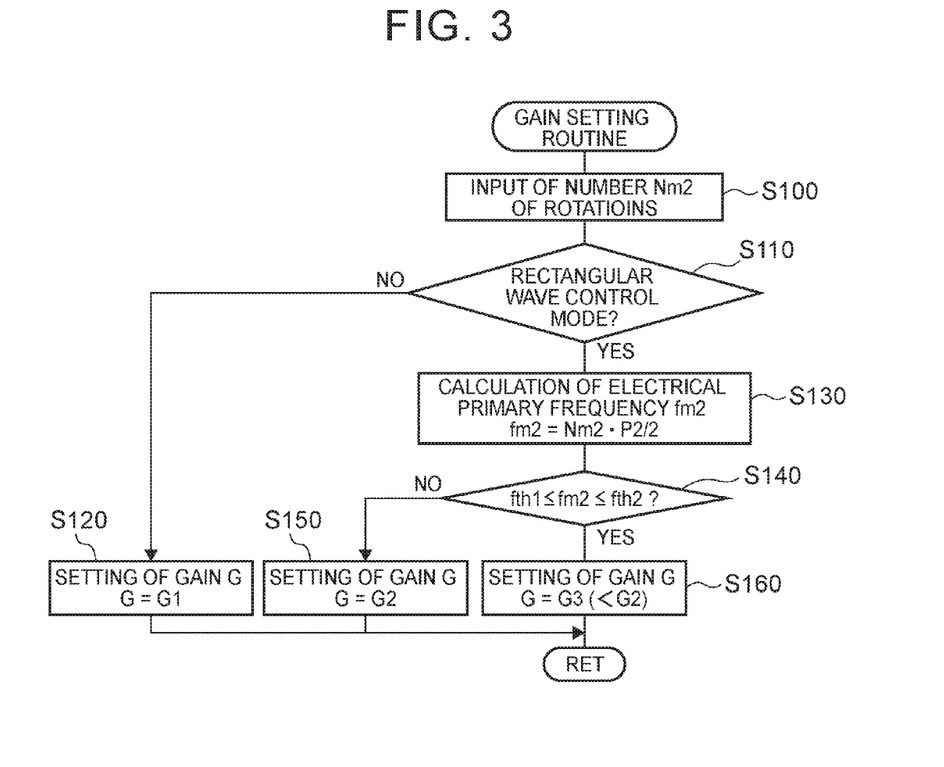
FIG. 3 is a flowchart illustrating an example of a gain setting routine to be executed by a motor ECU 40.

Next, the operation of the hybrid vehicle 20 of the first example configured in this way, and particularly, the operation when the gain G used for the current control is set will be described. FIG. 3 is a flowchart illustrating an example of a gain setting routine to be executed by the motor ECU 40. The main routine is repeatedly executed at every predetermined time (for example, every several milliseconds). In addition, in order to simplify description, it is supposed that the hybrid vehicle 20 is traveling in the EV traveling mode.

If the main routine is executed, the motor ECU 40 executes the processing of inputting the rotational speed Nm2 of the motor MG2 (Step S100). As the rotational speed Nm2 of the motor MG2, one that is calculated on the basis of the rotational position em2 of the rotor of motor MG2 is input.

Subsequently, it is determined whether or not the control mode of the inverter 42 is the rectangular wave control mode (Step S110). Determining whether the control mode of an inverter 42 is the rectangular wave control mode is considered to be because the fluctuation of the output of the motor MG2 with respect to the fluctuation of the voltage VH of the high-voltage-side power line 54a in the rectangular wave control mode become greater as that in the other control modes.

When the control mode of the inverter 42 is not the rectangular wave control mode, that is, when the control mode is the sinusoidal control mode or the overmodulation control mode, the value G1 is set as the gain G (Step S120), and the main routine is ended. Here, as the value G1, a value that is determined in advance as the value of the gain used for the control mode is used. If the gain G is set in this way, the motor ECU 40 executes the above-described current control using the gain G set to the value G1. By such control, the voltage VH of the high-voltage-side power line 54a is used as the target voltage VH* with improved response.

Figure 4:
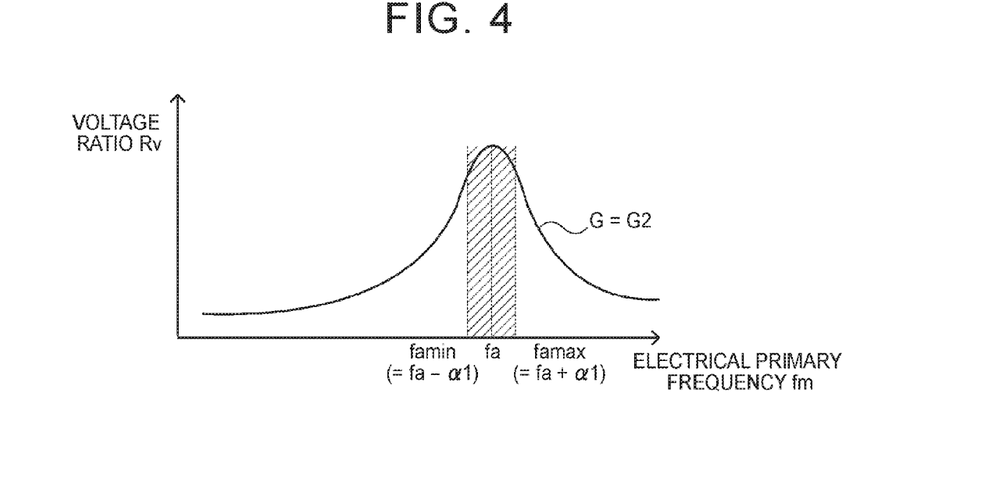
FIG. 4 is an explanatory view illustrating a relationship between an electrical primary frequency fm2 and a voltage ratio Rv (VH/VL) of an output voltage (a voltage VH of a high-voltage-side power line 54a) to an input voltage (a voltage VL of a low-voltage-side power line 54b) of a boosting converter 55.

When the control mode of the inverter 42 is the rectangular wave control mode, a primary component (electrical primary frequency) fm2 of the frequency of power fluctuation of the motor MG2 is calculated by the following Expression (2) using the rotational speed Nm2 of the motor MG2 and a number P2 of poles of the motor MG2 (Step S130), and it is determined whether or not the electrical primary frequency fm2 is within a range of a determination threshold value fth1 or greater and a determination threshold value fth2 or smaller (Step S140). The determination threshold values fth1, fth2 are a lower limit frequency famin and an upper limit frequency famax of a resonant frequency band including a resonant frequency fa at which resonance occurs in a circuit including the reactor L and the capacitor C of the boosting converter 55, when the current control is executed using a value G2 as the gain G Here, the value G2 is a value of the gain G to be basically used when the control mode of the inverter 42 is the rectangular wave control mode. As the value G2, a value that is determined in advance as a value at which the control response of the boosting converter 55 can be made relatively high is used. FIG. 4 is an explanatory view illustrating a relationship between the electrical primary frequency fm2 and a voltage ratio Rv (VH/VL) of an output voltage (the voltage VH of the high-voltage-side power line 54a) to an input voltage (the voltage VL of the low-voltage-side power line 54b) of the boosting converter 55. In this drawing, a hatched region is the resonant frequency band. As illustrated, the resonant frequency band is a region that is determined in advance as a region where the voltage ratio Rv becomes relatively great, and in the first example, is a range of the lower limit frequency famin (=fa−α1) that is smaller by a value α1 than the resonant frequency fa to an upper limit frequency famax (=fa+α1) that is greater by the value α1 than the resonant frequency fa. Therefore, the processing of Step S140 is the processing of determining whether or not the electrical primary frequency fm2 of motor MG2 falls within the resonant frequency band when the current control is executed with the value G2 as the gain G.

$$fm2 = Nm2 \cdot P2/2 \quad (2)$$

Figure 5:
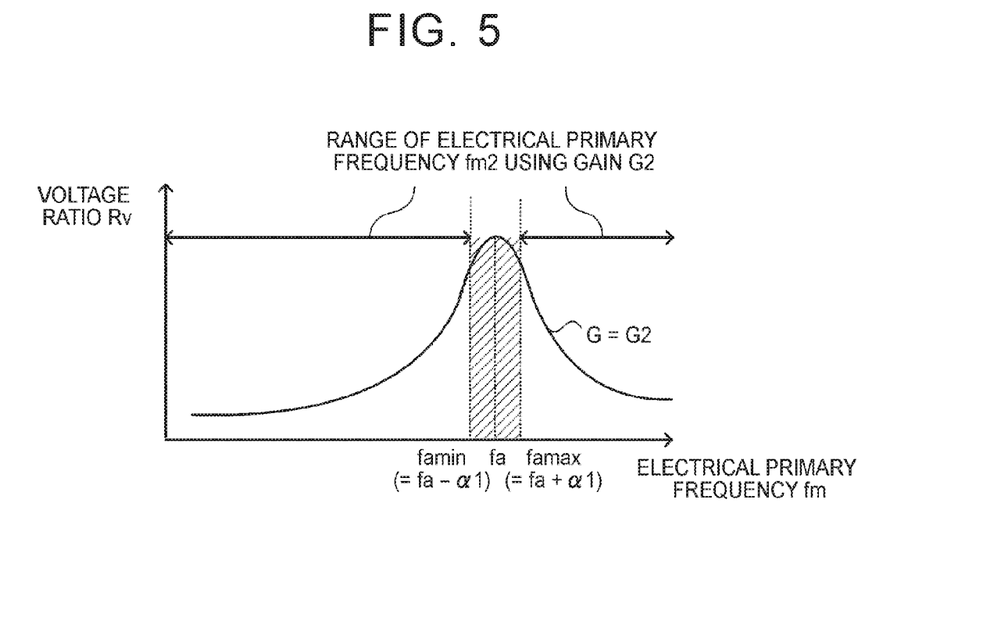
FIG. 5 is an explanatory view illustrating a relationship between the range of an electrical primary frequency fm2 at which current control is executed using a gain G set to a value G2, and a resonant frequency band.

When the electrical primary frequency fm2 is smaller than the determination threshold value fth1 or greater than the determination threshold value fth2 (Step S140), it is determined that the electrical primary frequency fm2 does not falls within the resonant frequency band even if the current control is executed with the value G2 as the gain G, the gain G is set to the value G2 (Step S150), and the main routine is ended. If the gain G is set in this way, the motor ECU 40 executes the above-described current control using the gain G set to the value G2. FIG. 5 is an explanatory view illustrating a relationship between the range of the electrical primary frequency fm2 at which the current control is executed using the gain G set to the value G2, and the resonant frequency band. In this drawing, a hatched region is the resonant frequency band. By setting the gain G to the value G2 in this way, the electrical primary frequency fm2 is prevented from falling within the resonant frequency band. As a result, the resonance of the boosting converter 55 can be prevented, the fluctuation of the voltage VH can be preventing from becoming great, and the fluctuation of the power output from the motor MG2 can be prevented from further increasing.

Figure 6:
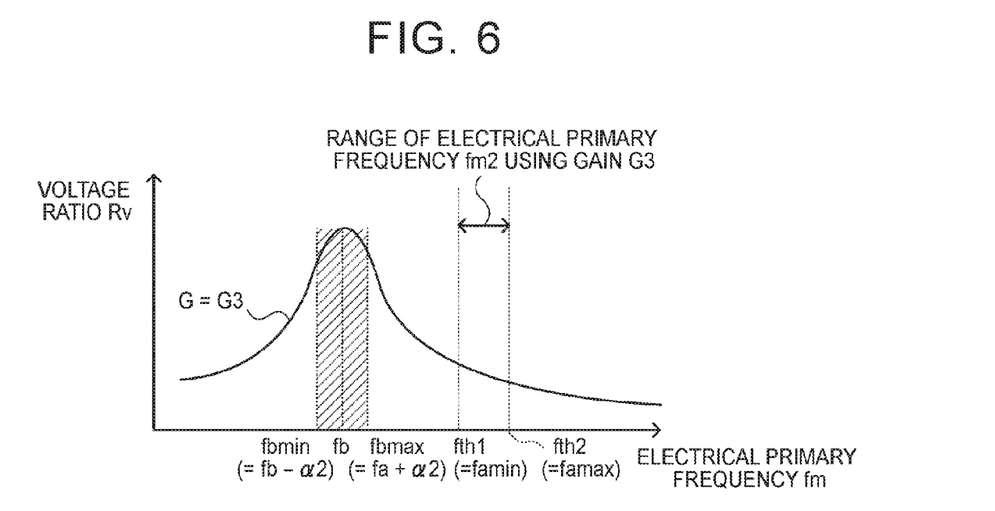
FIG. 6 is an explanatory view illustrating a relationship between the range of the electrical primary frequency fm2 at which current control is executed using the gain G set to a value G3, and a resonant frequency band.

If the current control is executed with the value G2 as the gain G when the electrical primary frequency fm2 is equal to or greater than the determination threshold value fth1 and equal to or smaller than the determination threshold value fth2 (Step S140), it is determined that the electrical primary frequency fm2 falls within the resonant frequency band, the gain G is set to a value G3 (Step S160), and the main routine is ended. In this way, if the gain G is set, the motor ECU 40 executes the above-described current control using the gain G set to the value G3. The value G3 is a value at which an upper limit frequency fbmax of the resonant frequency band of the boosting converter 55 (a frequency obtained by adding a predetermined value α2 to a resonant frequency fb) becomes smaller than the above-described lower limit frequency famin when the current control is executed using the gain G set to the value G3. Generally, since the resonant frequency when the gain G is smaller becomes smaller than that when the gain is greater, the value G3 is a value smaller than the value G2. FIG. 6 is an explanatory view illustrating a relationship between the range of the electrical primary frequency fm2 at which the current control is executed using the gain G set to the value G3, and the resonant frequency band. In this drawing, a hatched region is the resonant frequency band. As illustrated, the resonant frequency band is a region that is determined in advance as a region where the voltage ratio Rv becomes relatively great, and in the first example, is a range of a lower limit frequency fbmin (=fb−α2) at which the electrical primary frequency is smaller by the value α2 than the resonant frequency fb to an upper limit frequency fbmax (=fb+α2) at which the electrical primary frequency is greater by the value α2 than the resonant frequency fb. As illustrated, if the gain G is set to the value G3, the electrical primary frequency fm2 is prevented from becoming a frequency within the resonant frequency band. As a result, the resonance of the boosting converter 55 can be prevented, the fluctuation of the voltage VH can be prevented from becoming great, and the fluctuation of the power output from the motor MG2 can be prevented from further increasing. Generally, the motor ECU 40 is required to have higher processing performance when the value of the gain G is greater than that when the value of the gain G is smaller. In the first example, the resonance of the boosting converter 55 can be prevented without obtaining still higher processing performance for the motor ECU 40 by setting the gain G to the value G3 smaller than the value G2.

According to the hybrid vehicle 20 of the first example described above, the value G2 is set as the gain G when the electrical primary frequency fm2 is smaller than the determination threshold value fth1 or is greater than the determination threshold value fth2, the value G3, which is smaller than the value G2 and at which the upper limit frequency fbmax becomes smaller than the lower limit frequency famin when the current control is executed with the value G2 as the gain G, is set when the electrical primary frequency fm2 is equal to or greater than the determination threshold value fth1 and equal to or smaller than the determination threshold value fth2, and the current control in the boosting converter 55 is executed using the gain G that is set in this way. Accordingly, the resonance of the boosting converter 55 can be prevented.

In the hybrid vehicle 20 of the first example, in the processing of Step S160 of the gain setting routine illustrated in FIG. 3, the gain G is set to the value G3 smaller than the value G2. However, any values may be set if the gain G has a value such that electrical primary frequency fm2 becomes a frequency outside of the resonant frequency band. For example, in a case where the processing performance of the motor ECU 40 is allowed to be still higher, the gain G may have a greater than the value G2. In this case, instead of the processing of Step S160 of the gain setting routine illustrated in FIG. 3, the gain G may be is set such that the resonant frequency band becomes sufficiently greater than the electrical primary frequency when the motor MG2 is made to have an allowed maximum engine speed.

Figure 7:
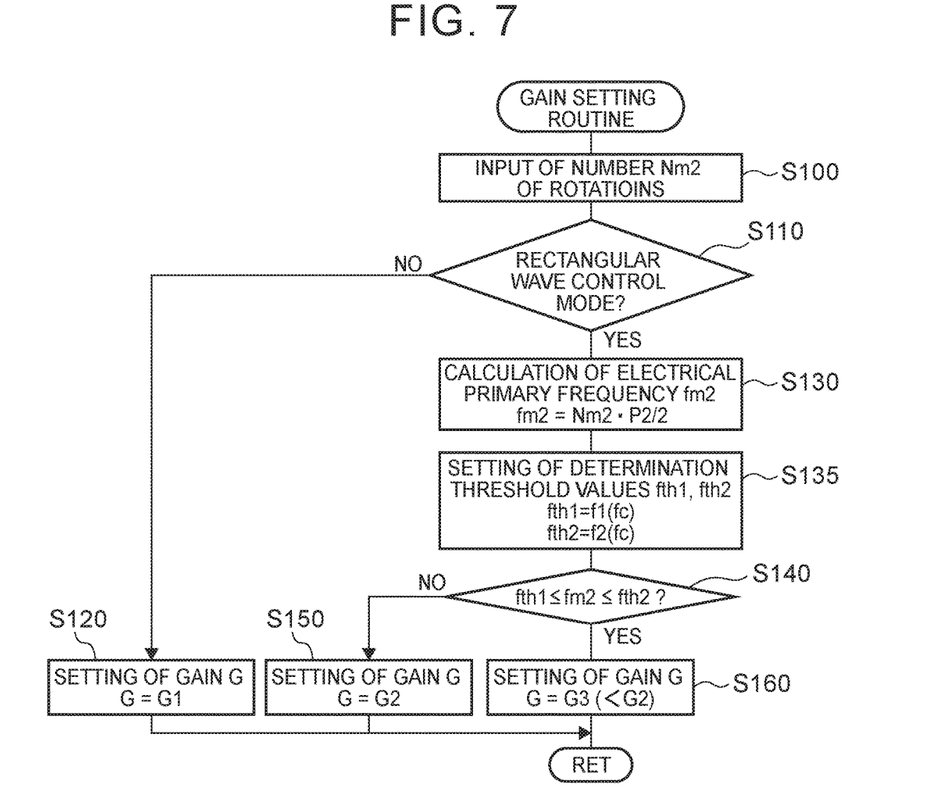
FIG. 7 is a flowchart illustrating an example of a gain setting routine of a modification example in which determination threshold values fth1, fth2 are set using a carrier frequency fc.

In the hybrid vehicle 20 of the first example, in the processing of Step S140 of the gain setting routine illustrated in FIG. 3, the lower limit frequency famin and the upper limit frequency famax of the resonant frequency band of the boosting converter 55 when the current control is executed with the value G2 as the gain G are used as the determination threshold values fth1, fth2. In a case where the carrier frequency fc when the switching of the transistors T31, T32 is changed according to the temperature of the transistors T31, T32, or the like, the determination threshold values fth1, fth2 are set using the carrier frequency fc. FIG. 7 is a flowchart illustrating an example of a gain setting routine of a modification example in which the determination threshold values fth1, fth2 are set using the carrier frequency fc. In this routine, the same processing as the gain setting routine of FIG. 3 is executed except that the processing of Step S135 is executed between the processing of Step S130 and the processing of Step S140 of the gain setting routine illustrated in FIG. 3.

Figure 8:
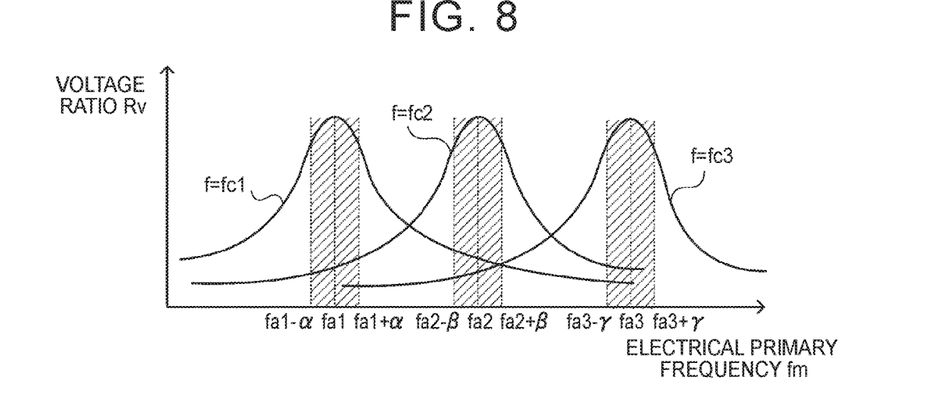
FIG. 8 is an explanatory view illustrating a relationship between the electrical primary frequency fm and the voltage ratio Rv (VH/VL) of the boosting converter 55 when the carrier frequency fc is changed to values fc1, fc2, fc3 (fc1<fc2<fc3), in a case where the gain G is a value G2.

In the gain setting routine of the modification example, if the electrical primary frequency fm2 is executed (Step S130), subsequently, the determination threshold values fth1, fth2 using the carrier frequency fc when the switching of the transistors T31, T32 are controlled (Step S135). FIG. 8 is an explanatory view illustrating a relationship between the electrical primary frequency fm and the voltage ratio Rv (VH/VL) of the boosting converter 55 when the carrier frequency fc is changed to values fc1 to fc3 (fc1<fc2<fc3), in a case where the gain G is the value G2. In this drawing, the values fa1 to fa3 show resonant frequencies when the carrier frequency fc are set to values fc1 to fc3, respectively. In this drawing, a hatched region is the resonant frequency band. As illustrated, when the carrier frequency fc is high, the resonant frequency is higher than that when the carrier frequency is low, and the resonant frequency band is on the high-frequency side. In the processing of Step 5135, the relationship between the carrier frequency and the lower limit frequency and the upper limit frequency of the resonant frequency band when the gain G is the value G2 is determined in advance and stored in the ROM (not illustrated), and if the carrier frequency is given, a lower limit frequency and an upper limit frequency corresponding to the given carrier frequency are set to the determination threshold values fth1, fth2, respectively. In the gain setting routine of the modification example, whether or not the electrical primary frequency fm2 of the motor MG2 falls within the resonant frequency band when the processing of Step S140, that is, the current control is executed with the value G2 as the gain G is determined using the determination threshold values fth1, fth2 set in this way. Thus, this determination can be more accurately performed. Accordingly, the electrical primary frequency fm2 can be more appropriately prevented from becoming a frequency within the resonant frequency band, and the resonance of the boosting converter 55 can be prevented.

In the hybrid vehicle 20 of the first example, in the gain setting routine of FIG. 3, the processing of Step S110 is executed, and when the control mode of the inverter 42 is the rectangular wave control mode, the processing of Steps S130 to S160 are executed. However, the processing of Steps S130 to S160 may be executed irrespective of the control mode of the inverter 42 without executing the processing of Steps S110, S120.

Next, a hybrid vehicle 20B of a second example of the invention will be described. The hybrid vehicle 20B of the second example has the same hardware configuration as the hybrid vehicle 20 of the first example described with reference to FIGS. 1 and 2, and the same control as the hybrid vehicle 20 is performed except for a method of controlling the boosting converter 55. Therefore, in order to avoid duplicate description, description about the hardware configuration and the like of the hybrid vehicle 20B of the second example will be omitted.

Figure 9:
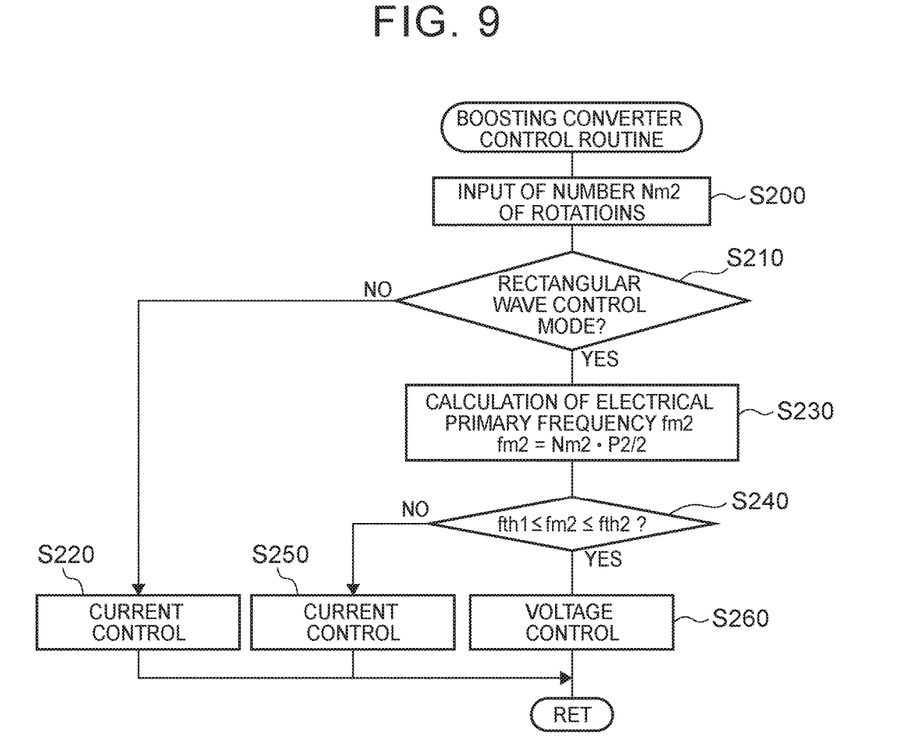
FIG. 9 is a flowchart illustrating an example of a boosting converter control routine to be executed by the motor ECU 40 of a hybrid vehicle 20B of a second example.

In the hybrid vehicle 20 of the first example, in the gain setting routine illustrated in FIG. 3, when the electrical primary frequency fm2 is equal to or greater than the determination threshold value fth1 and equal to or smaller than the determination threshold value fth2, the gain G is set to the value G3 and the current control is executed using the set gain G. If degradation of the response of control of the boosting converter 55 is allowed, when the electrical primary frequency fm2 is the determination threshold value fth1 or greater and the determination threshold value fth2 or smaller, the execution of the current control may be stopped. FIG. 9 is a flowchart illustrating an example of a boosting converter control routine to be executed by the motor ECU 40 of the hybrid vehicle 20B of the second example. The main routine is repeatedly executed at every predetermined time (for example, every several milliseconds).

If the main routine is executed, the motor ECU 40 inputs the rotational speed Nm2 (Step S200) and determines whether or not the control mode of the inverter 42 is the rectangular wave control mode (Step S210), through the same processing as Step S100 and S110 of the gain setting routine of FIG. 3. Then, when the control mode is the rectangular wave control mode, the current control in the boosting converter 55 is executed (Step S220), and the main routine is ended.

When the control mode of an inverter 42 is the rectangular wave control mode, the electrical primary frequency fm2 is calculated (Step S230) and it is determined whether or not the calculated electrical primary frequency fm2 is equal to or greater than the determination threshold value fth1 and equal to or smaller than the determination threshold value fth2 (Step S240), through the same processing as Steps S130, S140 of the gain setting routine of FIG. 3. When the electrical primary frequency fm2 is smaller than the determination threshold value fth1 or greater than the determination threshold value fth2, the current control is executed (Step S250) and the main routine is ended, and when the electrical primary frequency fm2 is equal to or greater than the determination threshold value fth1 and equal to or smaller than the determination threshold value fth2, the current control is stopped, the voltage control is executed (Step S260), and the main routine is ended. Here, the voltage control is control in which the target duty ratio Dtag* of the two transistors T31, T32 of the boosting converter 55 is set such that the voltage VH of the high-voltage-side power line 54a becomes the target voltage VH*, and switching of the transistors T31, T32 is controlled using the set target duty ratio Dtag* and the carrier frequency fc. Although the response of such voltage control becomes lower than that of the above-described current control, the resonance of the boosting converter 55 caused by performing the current control does not occur. Thus, if the fluctuation of the voltage VH become great, the fluctuation of the power output from the motor MG2 can be prevented from further increasing.

According to the hybrid vehicle 20B of the second example described above, when the electrical primary frequency fm2 is equal to or greater than the determination threshold value fth1 and equal to or smaller than the determination threshold value fth2, the occurrence of resonance in the circuit including the reactor L and the capacitor C of the boosting converter 55 can be prevented by stopping the current control and executing the voltage control.

In the hybrid vehicle 20B of the second example, in the processing of Step S260 of the boosting converter control routine illustrated in FIG. 9, the current control is stopped and the voltage control is executed. Instead of the processing of Step S260, current control using a carrier frequency fc different from that when the processing of Step S250 is executed may be performed. As described above, the resonant frequency and the resonant frequency band are changed according to the carrier frequency fc. Therefore, the resonance of the boosting converter 55 can be prevented by selecting the carrier frequency fc such that the electrical primary frequency fm2 becomes a frequency outside of the resonant frequency band. In this case, if the carrier frequency fc is made greater than the carrier frequency when the processing of Step S250 is executed, the switching loss of the transistors T31, T32 increases. Thus, it is desirable to make the carrier frequency fc smaller.

In the hybrid vehicle 20B of the second example, in the boosting converter control routine of FIG. 9, the processing of Step S210 is executed, and when the control mode of the inverter 42 is the rectangular wave control mode, the processing of Steps S230 to S260 are executed. However, the processing of Steps S230 to S260 may be executed irrespective of the control mode of the inverter 42 without executing the processing of Steps S210, S220.

In the hybrid vehicles 20 and 20B of the first and second examples, In the processing of Steps S130, S140 of the gain setting routine illustrated in FIG. 3 and in the processing of Steps S230, S240 of the boosting converter control routine illustrated in FIG. 9, the electrical primary frequency fm2 of the motor MG2 is calculated and the electrical primary frequency fm2 of the motor MG2 is compared with the determination threshold values fth1, fth2. However, the electrical primary frequency fm1 of the motor MG1 may be calculated, and the electrical primary frequency fm1 of the motor MG1 may be compared with the determination threshold values fth1, fth2.

In the first and second example, the invention is applied to hybrid vehicles including the engine 22 and the motors MG1, MG2. However, the invention may be applied to any kinds of vehicles as long as vehicles including a motor, an inverter that controls this motor, and a boosting converter that boosts the voltage from a battery are provided.

Correspondence relationships between the main elements of the examples and the main elements of the invention described in the column of the means for solving the problems will be described. In the examples, the motor MG2 may be equivalent to a "motor", the inverter 42 may be equivalent to an "inverter", the battery 50 may be equivalent to a "battery", the boosting converter 55 is equivalent to a "boosting converter", and the motor ECU may be equivalent to "controlller".

In addition, since the correspondence relationships between the main elements of the examples and the main elements of the invention described in the column of means for solving the problems are examples for specifically describing modes for carrying out the invention described in the column of the means for the examples to solve the problems, the invention is not limited to the elements of the invention described in the column of the means for solving the problems. That is, interpretation about the invention described in the column of the means for solving the problems should be performed on the basis of the description of the column, and the examples are merely specific examples of the invention described in the column of the means for solving the problems.

Although the modes for carrying out the invention have been described above using the examples, the invention is not limited to such examples at all, and can be naturally carried out in various forms without departing from the scope of the invention.

The invention is available for a vehicle manufacturing industry, and the like.

What is claimed is:

1. A vehicle comprising:
a motor;
an inverter for driving the motor;
a battery;
a boosting converter including a reactor and a capacitor and being connected to a first power line to which the inverter is connected and a second power line to which the battery is connected; and
a controller that sets a target current of the reactor such that a voltage of the first power line becomes a target voltage and executes a current control in which the boosting converter is controlled using a gain such that a reactor current flowing to the reactor becomes the target current,
wherein the controller sets the gain such that a frequency of power fluctuation of the motor based on a rotational speed of the motor becomes a frequency outside of a resonant frequency band where resonance occurs in a circuit including the reactor and the capacitor of the boosting converter when the current control is executed.

2. The vehicle according to claim 1,
wherein the controller controls the inverter in a plurality of control modes including a rectangular wave control mode such that a torque is output from the motor, and sets the gain such that the frequency of power fluctuation of the motor falls out of the resonant frequency band when the control mode is the rectangular wave control mode.

3. The vehicle according to claim 1,
wherein the resonant frequency band is set using a carrier frequency for controlling the boosting converter.

4. The vehicle according to claim 3,
wherein the controller sets the gain to a first value such that the frequency becomes a frequency outside of the resonant frequency band when the frequency of power fluctuation of the motor is within the resonant frequency band, and
sets the gain to a second value different from the first value such that the frequency is kept out of the resonant frequency band when the frequency of power fluctuation of the motor is out of the resonant frequency band.

5. A vehicle comprising:
a motor;
an inverter for driving the motor;
a battery;
a boosting converter including a reactor and a capacitor and being connected to a first power line to which the inverter is connected and a second power line to which the battery is connected; and
a controller that sets a target current of the reactor such that a voltage of the first power line becomes a target voltage and executes a current control in which the boosting converter is controlled using a gain such that a reactor current flowing to the reactor becomes the target current,
wherein the controller stops the current control to execute a voltage control in which the boosting converter is controlled such that a voltage of the first power line becomes a target voltage, when a frequency of power fluctuation of the motor based on a rotational speed of the motor is in a resonant frequency band where resonance occurs in a circuit including the reactor and the capacitor of the boosting converter when the current control is executed.

6. The vehicle according to claim 5,
wherein the controller controls the inverter in a plurality of control modes including a rectangular wave control mode such that a torque is output from the motor, and stops the current control to execute the voltage control when the control mode is the rectangular wave control mode and the frequency of power fluctuation of the motor is in the resonant frequency band.

* * * * *